Figure 1:
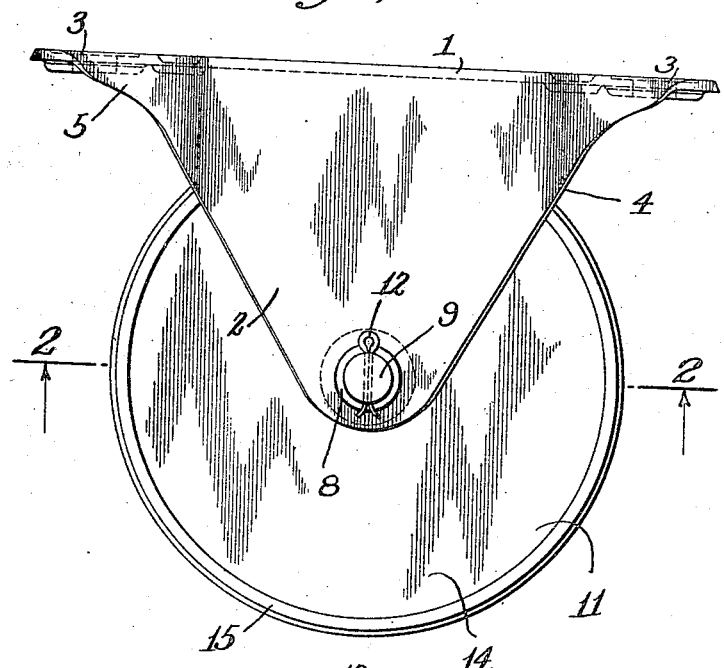

W. F. HEROLD.
CASTER.
APPLICATION FILED MAR. 23, 1921.

1,410,677.

Patented Mar. 28, 1922.

Inventor
Walter F. Herold
By his Attorney
Dyer Smith

UNITED STATES PATENT OFFICE.

WALTER F. HEROLD, OF NEWARK, NEW JERSEY, ASSIGNOR TO THE BASSICK COMPANY, OF BRIDGEPORT, CONNECTICUT, A CORPORATION OF CONNECTICUT.

CASTER.

1,410,677.

Specification of Letters Patent.   Patented Mar. 28, 1922.

Application filed March 23, 1921.   Serial No. 454,969.

*To all whom it may concern:*

Be it known that I, WALTER F. HEROLD, citizen of the United States, and resident of Newark, in the county of Essex and State of New Jersey, have invented certain new and useful Improvements in Casters, of which the following is a specification.

My invention relates to casters of the type which are fixedly secured to the articles of furniture which they are to support. It is particularly adapted for use in connection with trucks used in industrial plants and the like and for other service in which comparatively heavy weights must be carried.

My object is to provide a caster of the character referred to which shall be of comparatively light and simple construction but of sufficient strength and rigidity for the service for which it is designed.

In my application "Casters for trucks, etc.," Serial No. 454,968 filed March 23, 1921, I have described a caster having a frame, preferably formed of pressed steel or the like, in which side portions or flanges extend downwardly from a base, the axle for the caster wheel extending through aligned openings in these side portions of the frame. In that case an inner axle member is provided which is secured to the side portions of the frame with a rigid sleeve surrounding the inner axle member, the caster wheel being mounted on this sleeve and the ends of the sleeve abutting the inner surfaces of the side portions of the frame. With this construction the frame is strengthened and stiffened in all directions to a considerable extent.

In accordance with my present invention the same form of frame as that just referred to is preferably employed. In place of the inner axle and sleeve construction just referred to, however, I provide bearing members which are mounted within the openings in the side portions of the frame through which the axle extends. These bearing members or sleeves are provided at their inner ends with collar portions which surround the opening and which are pressed into contact with the inner surfaces of the frame side portions, the outer ends of the bearing sleeves preferably being pressed into engagement with the outer surfaces of the frame side portions to secure the same in position. With this construction the axle may be extended through the bearing sleeves and removably secured in position, the removal of the axle serving to permit the substitution of one caster wheel for another or the replacement of a tire on the wheel in case wheels provided with tires are desired. The flanged bearing sleeves provide a sufficient reinforcement to enable the caster to withstand the heavy service for which it is designed, the inner flanges of the bearing sleeves serving to take any endwise thrust of the hub of the caster wheel. The wheel hub is preferably of a strong and rigid construction with the ends thereof closely adjacent to the inner surfaces of the flanges referred to so that any tendency for the frame to move inwardly is resisted by the engagement of these flanges with the ends of the rigid axle.

Other objects of my invention consist in the various combinations of parts described more fully hereinafter in the following specification and pointed out in the appended claims.

Figure 2:
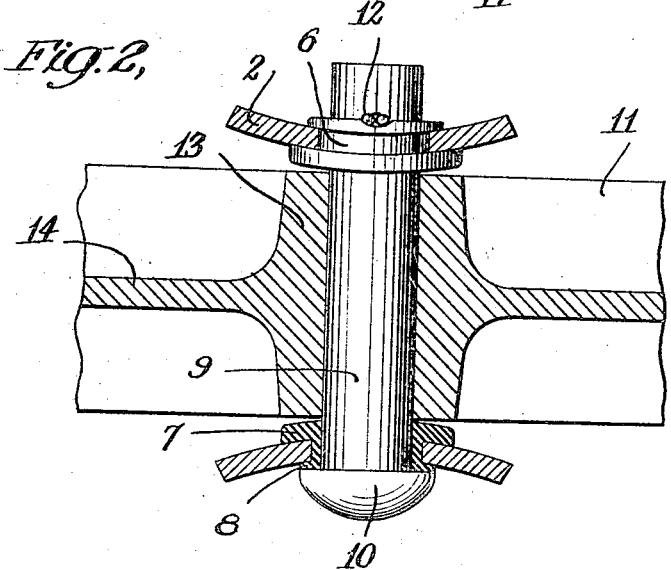

In order that the invention may be more clearly understood, attention is hereby directed to the accompanying drawings forming part of this application and illustrating one embodiment of my invention. In the drawings, Fig. 1 represents a side elevation of a caster embodying my invention and Fig. 2 represents a horizontal section taken on line 2—2 of Fig. 1, certain parts being shown in plan.

Referring to the drawings, the caster frame comprises a base portion 1 and a pair of downwardly extending side portions or flanges 2 which are preferably formed integral with base portion 1. The base 1 is adapted to be screwed or otherwise secured to the under side of a truck or other object which is to be supported, screw holes being indicated at 3.

The frame is preferably formed of sheet metal such as steel which may be pressed to shape. The side portions 2 of the frame are preferably given a comparatively slight outward curvature in cross section throughout the greater portion of the width thereof. The outwardly curved central portion of each side flange 2 is preferably provided with inclined side edges as is indicated at 4, the side frame portions having short flanged portions 5 which may be approximately plane and parallel to each other at the intersections of the ends of the side flanges 2 with the base 1. This construction greatly stiffens the frame and resists collapse or buckling of the same under the vertical thrust of the weight which is supported by the caster.

The side flanges 2 of the frame are provided adjacent their lower ends with aligned openings through each of which extends a bearing and reinforcing member 6. Each member 6 preferably takes the form of a sleeve having a flange 7 at its inner end surrounding the opening. Each sleeve member is inserted into the opening from the inner side of a side flange 2 and is then secured in position by pressing the outer end portion of the sleeve radially outwards into firm engagement with the outer surface of the side portion 2 of the frame as is shown at 8. The inner flange 7 of the bearing sleeve is preferably given a curvature such that it will bear firmly against the inner surface of the curved side portion of the frame against which it is firmly pressed.

The axle for the caster wheel is extended through the bearing members thus positioned. The axle preferably takes the form of a rod 9 having a head or enlargement 10 at one end which will abut against the outer flange 8 of one of the bearing members when the axle is inserted into position. The caster wheel 11 is rotatably mounted on this axle. Withdrawal of the axle is prevented, preferably by a removable means such as the pin 12 indicated as extending through an opening in the axle at a point such that the pin will engage against the outer surface of the adjacent flange 8, at the end of the axle opposite from its head 10.

With this construction the wheel may readily be removed whenever it is desired to remove the same to replace a tire thereon or for any other cause, by the simple removal of the pin 12.

The caster wheel 11 may be of any suitable strong construction preferably one in which a rigid hub 13 is provided of a length sufficient to extend substantially between the reinforcing flanges 7 of the bearing sleeves. The wheel may suitably be formed of cast metal with the hub 13, a central web 14 and the rim 15 all of one integral construction.

With the construction described, the side portions 2 of the frame are considerably strengthened and stiffened by the provision of the bearing sleeves described. The inner flanges 7 of the bearing sleeves serve to take any outward thrust of the hub of the wheel against the same and inward movement of the side flanges 2 of the frame to any more than a slight extent is prevented by the engagement in such case of the flanges 7 against the end surfaces of hub 13.

It should be understood that the invention is not strictly limited to the details of construction described but is as broad as is indicated by the accompanying claims:

1. In a caster, the combination of a frame having a base portion and downwardly extending side portions having aligned openings therein, bearing and reinforcing members fixedly mounted in said openings, having collar portions at their inner ends, surrounding said openings and formed to solidly bear against the inner surfaces of said side portions, an axle extending through said bearing members and a wheel mounted on said axle.

2. In a caster, the combination of a frame having a base portion and outwardly curved, downwardly extending side portions having aligned openings therein, bearing and reinforcing members fixedly mounted in said openings, having reinforcing collar portions at their inner ends, surrounding said openings and formed to solidly bear against the inner curved surfaces of said side portions, an axle extending through said bearing members and a wheel mounted on said axle.

3. In a caster, the combination of a frame having a base portion and downwardly extending side portions having aligned openings therein, bearing and reinforcing members fixedly mounted in said openings, having collar portions at their inner ends, surrounding said openings and pressed solidly against the inner surfaces of said side portions, an axle extending through said bearing members and having an enlargement at one end and removable securing means at the other end, to prevent longitudinal movement thereof, and a wheel mounted on said axle, having a hub adapted to exert endwise thrust against said collar portions.

4. In a caster, the combination of a frame having a base portion and integral downwardly extending side portions having aligned openings therein, bearing sleeves extending through said openings and fixedly mounted therein having their outer end portions pressed radially outward against the outer surfaces of said side portions and provided at their inner ends with reinforcing flanges surrounding said openings and pressed solidly against the inner surfaces of said side portions, an axle extending through said sleeves, means for removably securing said axle against longitudinal movement, and a wheel mounted on said axle.

Signed at Newark, in the county of Essex and State of New Jersey, this 4th day of March, A. D. 1921.

WALTER F. HEROLD.